(12) United States Patent
Nakagomi et al.

(10) Patent No.: US 7,481,306 B2
(45) Date of Patent: Jan. 27, 2009

(54) WET-TYPE MULTIPLATE CLUTCH

(75) Inventors: Hirofumi Nakagomi, Fukuroi (JP); Tsuyoshi Hirayanagi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 245 days.

(21) Appl. No.: 11/274,503

(22) Filed: Nov. 16, 2005

(65) Prior Publication Data

US 2006/0118381 A1    Jun. 8, 2006

(30) Foreign Application Priority Data

Nov. 16, 2004    (JP)    ............................. 2004-332253

(51) Int. Cl.
*F16D 13/24*    (2006.01)
(52) U.S. Cl. ................................. 192/70.15
(58) Field of Classification Search ................ 192/52.1, 192/52.3, 70.15
See application file for complete search history.

(56) References Cited

U.S. PATENT DOCUMENTS 2,738,864 A * 3/1956 Becker .................... 192/70.14

FOREIGN PATENT DOCUMENTS

JP    5-141445 A    6/1993
JP    7-77222 A    3/1995

* cited by examiner

*Primary Examiner*—Charles A Marmor
*Assistant Examiner*—Derek D Knight
(74) *Attorney, Agent, or Firm*—Crowell & Moring LLP

(57) ABSTRACT

A wet-type multiplate clutch has an outer circumferential drum section, an inner circumferential hub, a pressing member, and a clutch engagement unit composed of plural friction plates and separator plates alternately arranged between the drum section and the hub. One of mutually-contacting walls of the drum section and clutch engagement unit and one of mutually-contacting walls of the unit and pressing member are provided at their predetermined contact areas with inclinations such that, when the clutch is out of engagement, the mutually-contacting walls of the drum section and unit and the mutually-contacting walls of the unit and pressing member form wedge-shaped spaces between them, respectively, as viewed in a radially-extending, axial cross-section, said wedge-shaped spaces being gradually reduced in widths thereof toward an exterior in a radial direction and, when the clutch is in engagement, the mutually-contacting walls of the drum section and unit and the mutually-contacting walls of the unit and pressing member radially extend at right angles relative to a central axis of the wet-type multiplate clutch and are in close contact with each other, respectively.

1 Claim, 9 Drawing Sheets

US 7,481,306 B2

WET-TYPE MULTIPLATE CLUTCH

FIELD OF THE INVENTION

This invention relates to a wet-type multiplate clutch, in which a clutch engagement unit composed of friction plates and separator plates receives a pressing force from a piston evenly at a substantially entire area of an associated contact wall of the clutch engagement unit and transmits the pressing force to an outer circumferential drum section evenly at a substantially entire area of an associated contact wall of the clutch engagement unit. The wet-type multiplate clutch is of small size and light weight, is practically free from partial wearing, and is good in the efficiency of power transmission.

DESCRIPTION OF THE BACKGROUND

FIG. 1 conceptionally illustrates in axial cross-section the construction of a wet-type multiplate clutch making use of a piston and a pressing member. The wet-type multiplate clutch 10 is equipped with an input shaft 20, an outer circumferential drum section 21 arranged integrally with the input shaft, and an output shaft 30 connected through splines with an inner circumferential hub 32 at spline grooves 31. Needless to say, the input and output directions may be reversed. With spline grooves 22 of the outer circumferential drum section 21, friction plates 50 are connected through splines, and with outer circumferential spline grooves 33 of the inner circumferential hub 32, separator plates 60 are connected through splines. These friction plates 50 and separator plates 60 are alternately arranged to make up the clutch engagement unit.

In a casing 47 for a piston mechanism arranged in a left part of the drawing, a piston 40 is accommodated such that an oil pressure chamber 41 is formed between the casing 47 and the piston 40. The piston 40 presses a pressing member 42 via a thrust bearing 71. As will be described subsequently herein, the pressing member 42 presses the clutch engagement unit, which is composed of the friction plate 50 and the separator plates 60, toward a pressing-force receiving portion 23 of the outer circumferential drum section 21 arranged in a right part of the drawing. Further, designated at numeral 48 in the drawing is a return spring interposed between the inner circumferential hub 32 and the pressing member 42.

When desired to engage the clutch, oil pressure is introduced into the oil pressure chamber 41 to press the pressing member 42 rightwards via the piston 40 and thrust bearing 71 such that the clutch engagement unit composed of the friction plates 50 and separator plates 60 is pressed toward the pressing-force receiving portion 23 of the outer circumferential drum section 21 arranged on the right side. As illustrated in the drawing, the friction plates 50 are connected through splines with the spline grooves 22 of the outer circumferential drum section 21, the separator plates 60 are connected through splines with the spline grooves 33 of the inner circumferential hub 32, and further, the inner circumferential hub 32 is connected through splines with the output shaft 30 at the spline grooves 31. Therefore, power is transmitted from the input shaft 20 to the output shaft 30.

When desired to disengage the clutch, the hydraulic pressure is drained from the oil pressure chamber 41. By the return spring 48, the pressing member 42 and piston 40 are caused to return leftwards so that the pressing force is no longer applied to the clutch engagement unit to result in disengagement of the clutch.

FIG. 2 is an axial cross-sectional view of a similar wet-type multiplate clutch. It is different from the clutch shown in FIG. 1 in that there is no discrete member corresponding to the pressing member 42, only a piston 40 is arranged, and a pressing portion 46 of the piston 40 corresponds to the pressing member 42 of the clutch depicted in FIG. 1. The remaining elements of structure are the same in both construction and reference numerals as the corresponding elements in FIG. 1. A subsequent description will, therefore, be made with respect to the pressing member 42. It should, however, be noted that the same description applies exactly to the pressing portion 46.

With reference to FIG. 3 through FIG. 6, a description will be made about the operation of the conventional apparatus. As illustrated in FIG. 3, a pressing wall 43 of the pressing member 42 and a pressing-force receiving wall 62 of the separator plate 60 arranged opposite the pressing member 42 are formed such that during the disengagement of the clutch, they radially extend at right angles relative to the central axis of the clutch (see FIG. 3). Upon engagement of the clutch, however, the pressing member 42 is flexed by a reaction force to the pressing force in a counterclockwise direction as viewed in FIGS. 1 and 3, and is brought into a state shown in FIG. 4. In this state, an outer circumferential area 44 of the pressing wall 43 of the pressing member 42 and an outer circumferential area 63 of the pressing-force receiving wall 62 of the separator plate 60 are apart from each other, while their inner circumferential areas 45 and 64 are in contact with each other. The pressing wall 43 as a pressing contact wall and the pressing-force receiving wall 62, therefore, form therebetween a wedge-shaped space, which becomes gradually greater in width toward an exterior in a radial direction, as viewed in a radially-extending, axial cross-section. As a consequence, a pressing force cannot be applied evenly from the entire area of the pressing wall 43 of the pressing member 42 to the entire area of the pressing-force receiving wall 62 of the separator plate 60. Designated at numeral 61 in the drawing is an inner circumferential spline of the separator plate 60.

FIG. 5 likewise illustrates the states of the pressing-force receiving portion 23 of the outer circumferential drum section 21 and the friction plate 50 in the conventional apparatus when the conventional apparatus is out of engagement. A pressing-force receiving wall 24 of the pressing-force receiving portion 23 and a pressing wall 53 of the friction plate 50 are formed such that, during the disengagement of the clutch, they radially extend at right angles relative to the central axis of the clutch. In the drawing, there are also depicted a spline groove 22 of the outer circumferential drum section 21, a spline 51 of the friction plate 50, and a friction lining 52 on the friction plate 50.

Upon engagement of the clutch, the pressing-force receiving portion 23 is flexed by a pressing force in a clockwise direction as viewed in FIGS. 1 and 5, and is brought into a state shown in FIG. 6. In this state, an outer circumferential area 25 of the pressing-force receiving wall 24 of the pressing-force receiving portion 23 and an outer circumferential area 54 of the pressing wall 53 of the friction plate 50 are apart from each other, while their inner circumferential areas 26 and 55 are in contact with each other. The pressing-force receiving wall 24 as a pressed contact wall and the pressing wall 53, therefore, form therebetween a wedge-shaped space, which becomes gradually greater in width toward an exterior in a radial direction, as viewed in a radially-extending, axial cross-section. As a consequence, a pressing force cannot be applied evenly from the entire area of the pressing wall 53 of the friction plate 50 to the entire area of the pressing-force receiving wall 24 of the pressing-force receiving portion 23.

FIG. 15 is a diagram in which the pressing force is plotted along an abscissa X and the position of the pressed contact wall in the radial direction is plotted along the ordinate Y. As explained above with reference to FIG. 3 through FIG. 6 as enlarged fragmentary views, the pressing member 42 and the pressing-force receiving portion 23 of the outer circumferential drum section 21 both undergo elastic deformations under the pressing force in the conventional apparatus. As mentioned above, the pressing force applied to the plate hence becomes uneven as indicated by p in FIG. 15, and the stress applied to the plate is not equal over the entire circumference of the plate. The conventional clutch, therefore, cannot avoid the inconvenience that the plates undergo partial wearing and the efficiency of power transmission is lowered.

SUMMARY OF THE INVENTION

To eliminate the above-described drawbacks, the present invention provides a wet-type multiplate clutch comprising an outer circumferential drum section, an inner circumferential hub, a pressing member, and a clutch engagement unit composed of plural friction plates and separator plates alternately arranged between the outer circumferential drum section and the inner circumferential hub such that the clutch engagement unit can be pressed by the pressing member toward a pressing-force receiving portion of the outer circumferential drum section, wherein:

one of mutually-contacting walls of the outer circumferential drum section and clutch engagement unit and one of mutually-contacting walls of the clutch engagement unit and pressing member are provided at predetermined contact areas thereof with inclinations such that, when the wet-type multiplate clutch is out of engagement, the mutually-contacting walls of the outer circumferential drum section and clutch engagement unit and the mutually-contacting walls of the clutch engagement unit and pressing member form wedge-shaped spaces therebetween, respectively, as viewed in a radially-extending, axial cross-section, said wedge-shaped spaces being gradually reduced in widths thereof toward an exterior in a radial direction and, when the wet-type multiplate clutch is in engagement, the mutually-contacting walls of the outer circumferential drum section and clutch engagement unit and the mutually-contacting walls of the clutch engagement unit and pressing member radially extend at right angles relative to a central axis of the wet-type multiplate clutch and are in close contact with each other, respectively.

Owing to the above-described construction, the friction plates and separator plates, which make up the clutch engagement unit, are each pressed evenly over its entire circumference upon engaging the clutch. Therefore, the wet-type multiplate clutch according to the present invention is of small size and light weight, is practically free from partial wearing, and is good in the efficiency of power transmission.

DETAILED DESCRIPTION OF THE INVENTION AND PREFERRED EMBODIMENTS

To form the wedge-shaped spaces, which are gradually reduced in widths thereof toward the exterior in the radial direction as viewed in axial cross-section, during the disengagement of the clutch between the pressing-force receiving wall of the pressing-force receiving portion of the outer circumferential drum section, which is integral with the input shaft, and the pressing wall of the associated plate in the clutch engagement unit and also between the pressing wall of the pressing member and the pressing-force receiving wall of the associated plate in the clutch engagement unit, respectively, the pressing-force receiving wall of the pressing-force receiving portion of the outer circumferential drum section and the pressing wall of the pressing member can be formed with inclinations, respectively, or the contact walls of the plates at opposite ends of the clutch engagement unit, said contact walls being to be brought into contact with the pressing-force receiving wall and the pressing wall, respectively, can be formed with inclinations, respectively.

Figure 1:
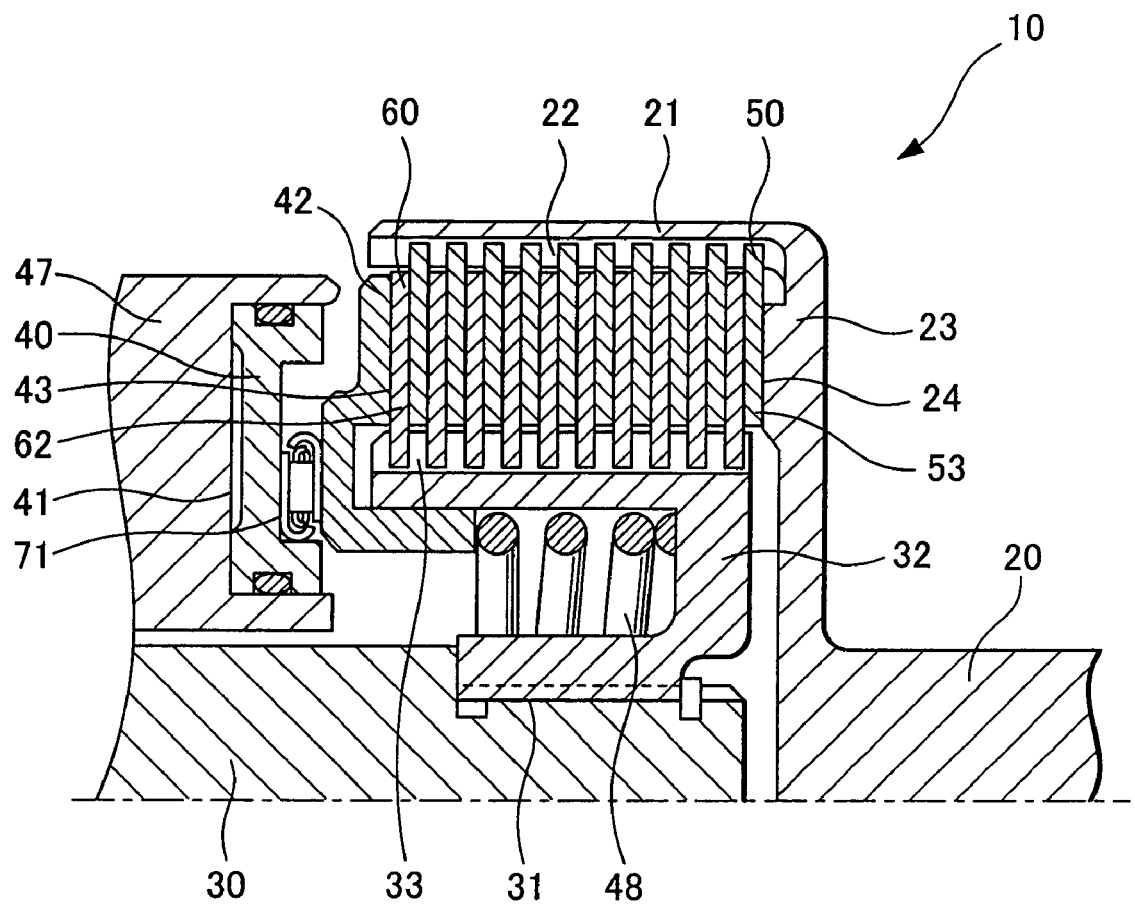
FIG. 1 is an axial cross-sectional view illustrating the basic construction of a conventional wet-type multiplate clutch.
Figure 2:
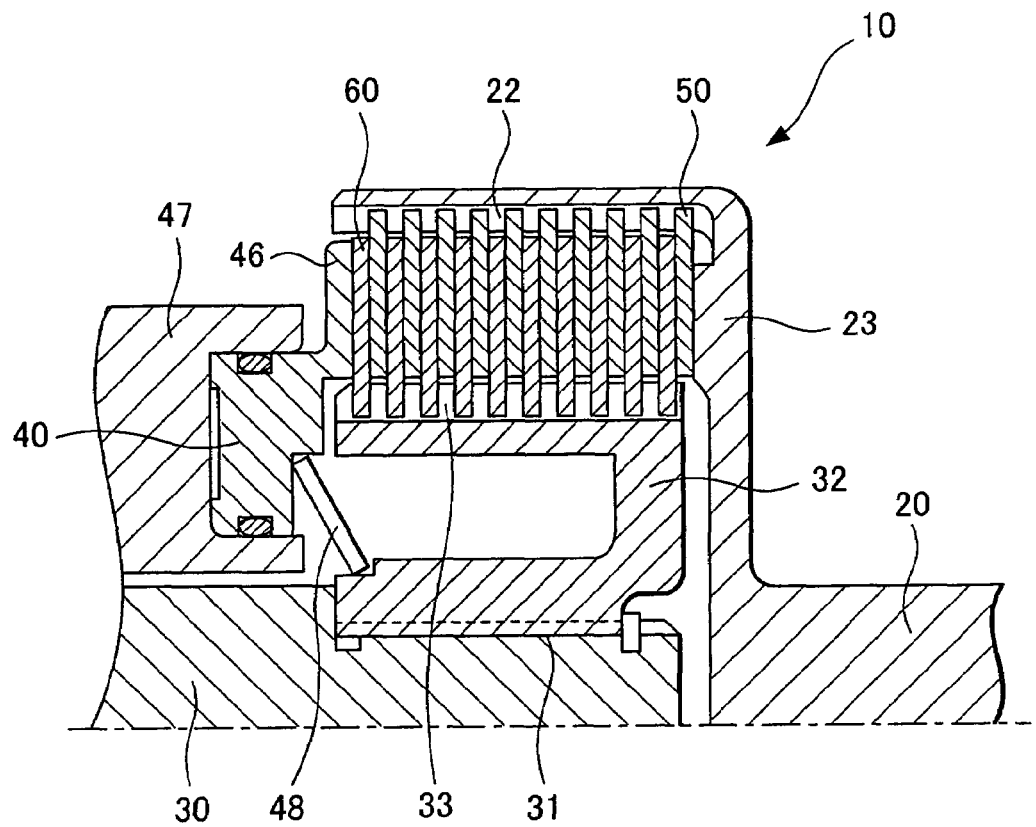
FIG. 2 is an axial cross-sectional view similar to FIG. 1, but shows another conventional model.
Figure 3:
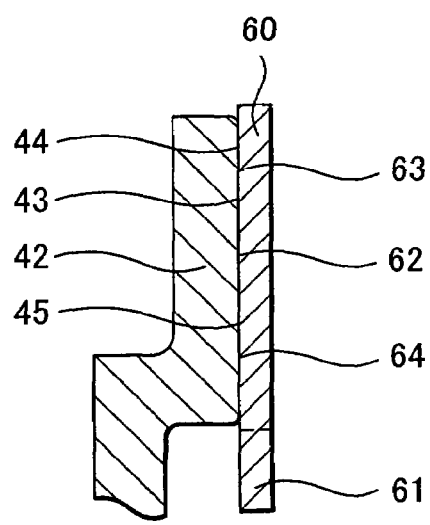
FIG. 3 is an enlarged fragmentary cross-sectional view of the conventional wet-type multiplate clutch of FIG. 1, and illustrates the states of a pressing member and a separator plate during disengagement of the clutch.
Figure 4:
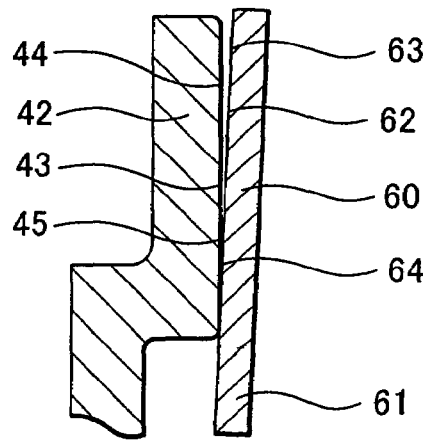
FIG. 4 is similar to FIG. 3, but shows their states upon engagement of the clutch.
Figure 5:
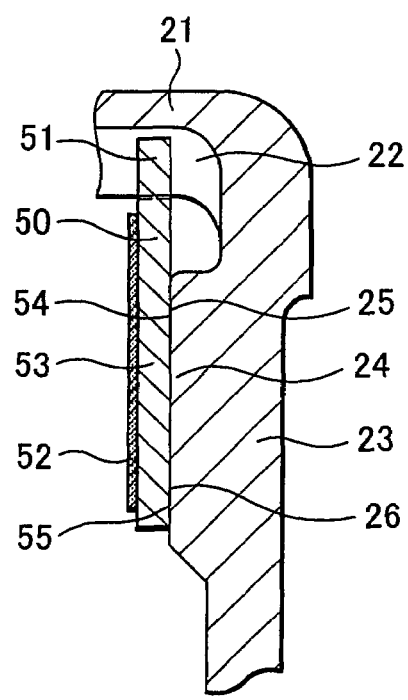
FIG. 5 is similar to FIG. 3, but depicts the states of a pressing-force receiving portion of an outer circumferential drum and a friction plate during disengagement of the clutch.
Figure 6:
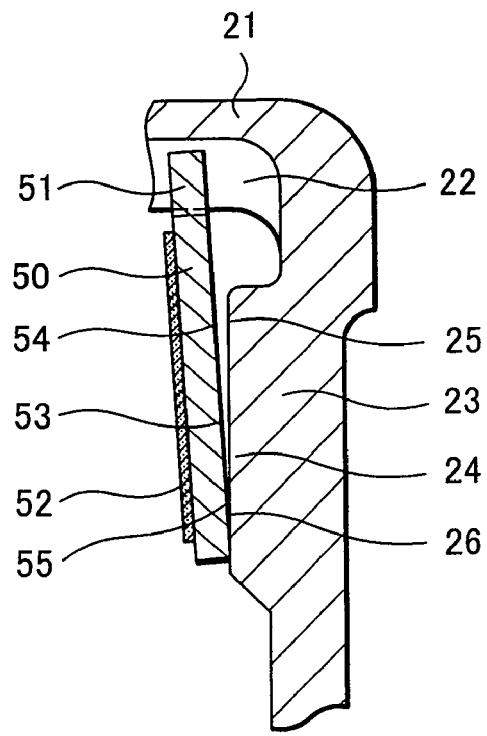
FIG. 6 is similar to FIG. 5, but shows their states upon engagement of the clutch.
Figure 7:
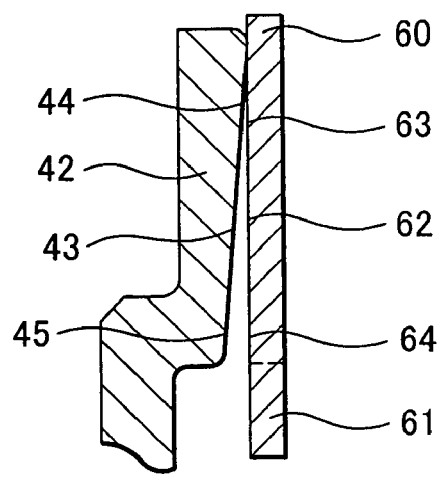
FIG. 7 is similar to FIG. 3, but depicts a wet-type multiplate clutch according to a first embodiment of the present invention.

Referring to FIG. 7 through FIG. 10, the wet-type multiplate clutch according to the first embodiment of the present invention will hereinafter be described. FIG. 7 through FIG.

10 correspond to FIG. 3 through FIG. 6, respectively, and like reference numerals indicate like elements of structure. FIG. 7 illustrates the state of a pressing member 42 during disengagement. Taking into account an elastic deformation of the pressing member 42 by a reaction force to a pressing force upon engagement, a pressing wall 43 of the pressing member 42 is formed with an inclination such that an inner circumferential area 45 of the pressing wall 43 is apart from an inner circumferential area 64 of the pressing-force receiving wall 62 of the separator plate 60 arranged opposite the pressing member 42. As the pressing member 42 and the separator plate 60 are in contact with each other at their outer circumferential areas 44 and 63, the pressing wall 43 as the pressing contact wall and the pressing-force receiving wall 62 form therebetween a wedge-shaped space which is gradually reduced in width toward the exterior in the radial direction as viewed in axial cross-section.

Figure 8:
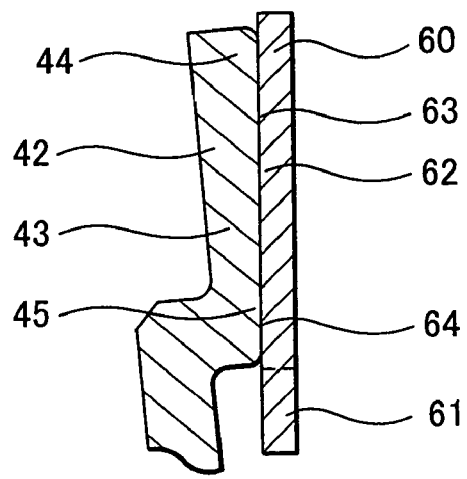
FIG. 8 is similar to FIG. 4, but depicts the states of a pressing member and a separator plate upon engagement of the wet-type multiplate clutch according to the first embodiment of the present invention.

FIG. 8 shows the state of the pressing member 42 upon engagement. As the pressing member 42 is flexed in a counterclockwise direction by a reaction force to a pressing force, the pressing wall 43 extends in a radial direction at a right angle relative to the central axis of the wet-type multiplate clutch so that the pressing wall 43 is in close contact with the pressing-force receiving wall 62 of the separator plate 60 over the entire circumference thereof. The pressing force is, therefore, applied evenly to substantially the entire area of the pressing-force receiving wall 62 of the separator plate 60.

Figure 9:
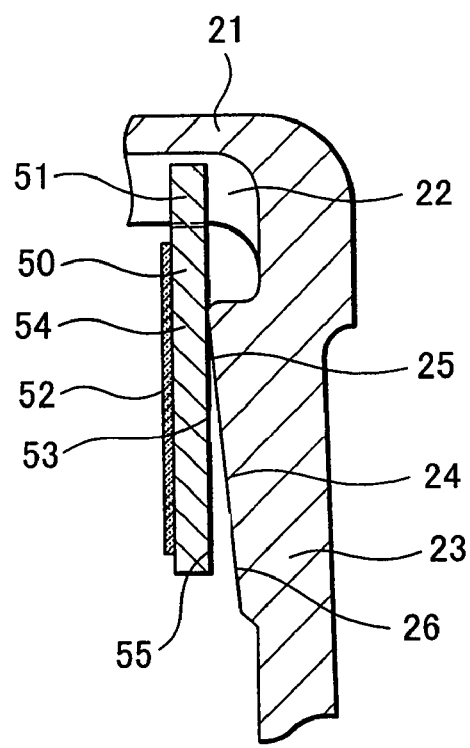
FIG. 9 is similar to FIG. 5, but depicts the states of a pressing-force receiving portion of an outer circumferential drum and a friction plate during disengagement of the wet-type multiplate clutch according to the first embodiment of the present invention.

FIG. 9 illustrates the state of the pressing-force receiving portion 23 of the outer circumferential drum section 21 during disengagement. Taking into account an elastic deformation of the pressing-force receiving portion 23 by a pressing force upon engagement, the pressing-force receiving wall 24 is formed with an inclination such that the inner circumferential area 26 of the pressing-force receiving wall 24 is apart from the inner circumferential area 55 of the pressing wall 53 of the friction plate 50 arranged opposite the pressing-force receiving wall 24. As the pressing-force receiving wall 24 and the pressing wall 53 are in contact with each other at their outer circumferential areas 25 and 54, the pressing-force receiving wall 24 as the pressed contact wall and the pressing wall 53 form therebetween a wedge-shaped space which is gradually reduced in width toward the exterior in the radial direction as viewed in axial cross-section.

Figure 10:
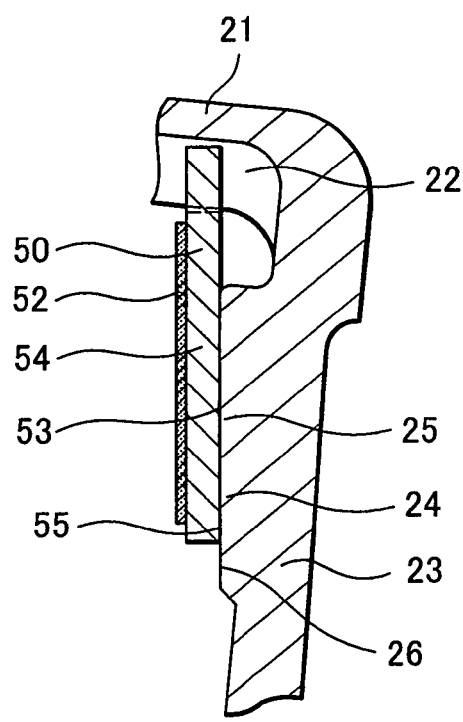
FIG. 10 is similar to FIG. 6, but depicts the states of the pressing-force receiving portion of the outer circumferential drum and the friction plate during engagement of the wet-type multiplate clutch according to the first embodiment of the present invention.

FIG. 10 shows the state of the pressing-force receiving portion 23 of the outer circumferential drum section 21 upon engagement. As the pressing-force receiving portion 23 is flexed in a clockwise direction by a pressing force, the pressing-force receiving wall 24 extends in a radial direction at a right angle relative to the central axis of the wet-type multiplate clutch so that the pressing-force receiving wall 24 of the pressing-force receiving portion 23 of the outer circumferential drum section 21 is in close contact with the pressing wall 53 of the friction plate 50 over the entire circumference thereof. The pressing force is, therefore, applied evenly to substantially the entire area of the pressing-force receiving wall 24 of the pressing-force receiving portion 23 of the outer circumferential drum section 21.

Figure 11:
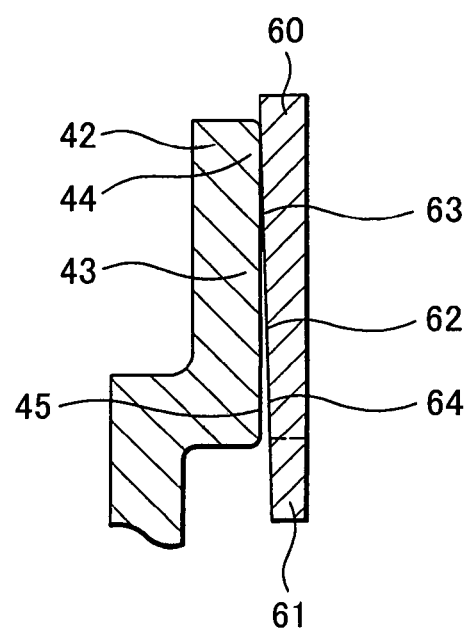
FIG. 11 is similar to FIG. 3, but depicts a wet-type multiplate clutch according to a second embodiment of the present invention.
Figure 12:
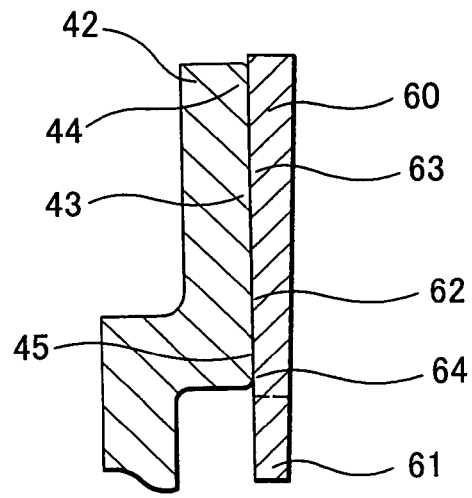
FIG. 12 is similar to FIG. 4, but depicts the states of a pressing member and a separator plate upon engagement of the wet-type multiplate clutch according to the second embodiment of the present invention.

Referring to FIG. 11 through FIG. 14, the wet-type multiplate clutch according to the second embodiment of the present invention will next be described. FIG. 11 through FIG. 14 correspond to FIG. 3 through FIG. 6, respectively, and also to FIG. 7 to FIG. 10, respectively, and like reference numerals also indicate like elements of structure. Describing based on FIG. 11 which corresponds to FIG. 7, a pressing-force receiving wall 62 of a separator plate 60 shown in FIG. 11 is formed with an inclination such that conversely to the construction shown in FIG. 7, an inner circumferential area 64 of the pressing-force receiving wall 62 is apart from an inner circumferential area 45 of a pressing wall 43 of a pressing member 42. As the pressing member 42 and the separator plate 60 are in contact with each other at their outer circumferential areas 44 and 63, the pressing-force receiving wall 62 as the pressed contact wall and the pressing wall 43 form therebetween a wedge-shaped space which is gradually reduced in width toward the exterior in the radial direction as viewed in axial cross-section. FIG. 12 shows the state of the separator plate 60 upon engagement of the clutch. As the pressing member 42 is elastically flexed in a counterclockwise direction by a reaction force to a pressing force, the pressing wall 43 and the pressing-force receiving wall 62 are brought into close contact with each other as shown in the drawing. The pressing force is, therefore, applied evenly to substantially the entire area of the pressing-force receiving wall 62 of the separator plate 60.

Figure 13:
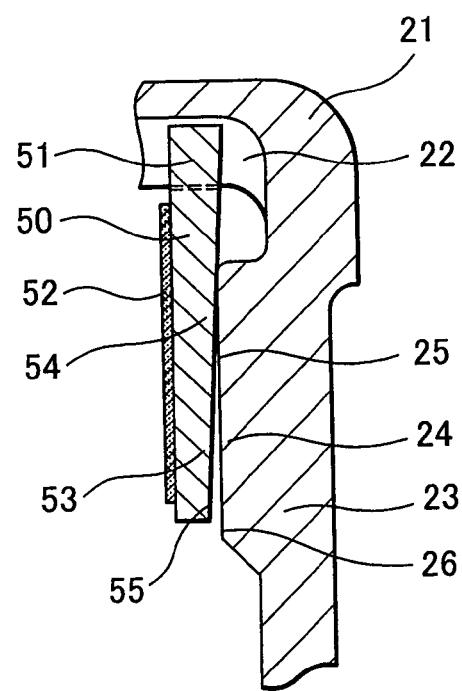
FIG. 13 is similar to FIG. 5, but depicts the states of a pressing-force receiving portion of an outer circumferential drum and a friction plate during disengagement of the wet-type multiplate clutch according to the second embodiment of the present invention.
Figure 14:
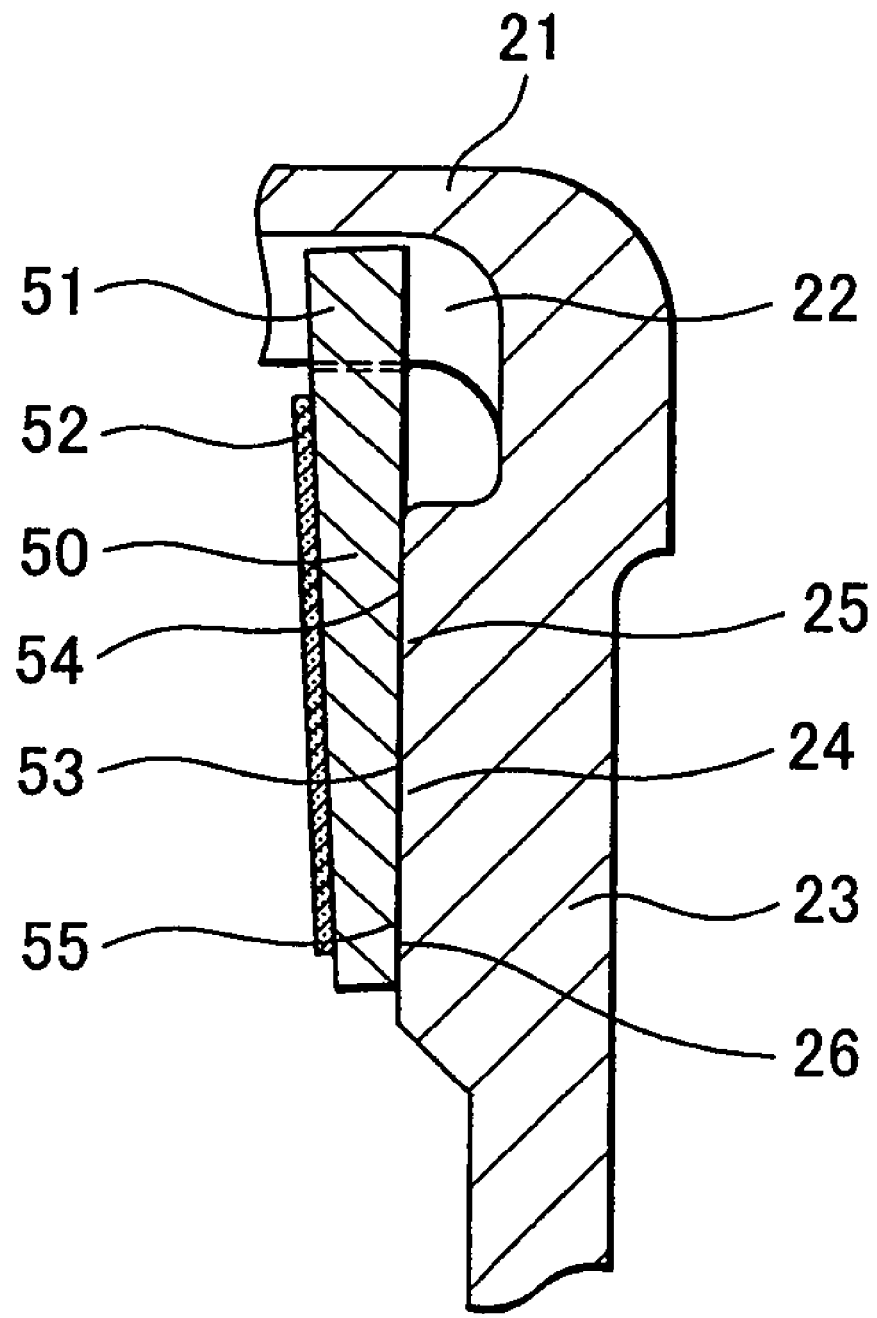
FIG. 14 is similar to FIG. 6, but depicts the states of the pressing-force receiving portion of the outer circumferential drum and the friction plate during engagement of the wet-type multiplate clutch according to the second embodiment of the present invention.
Figure 15:
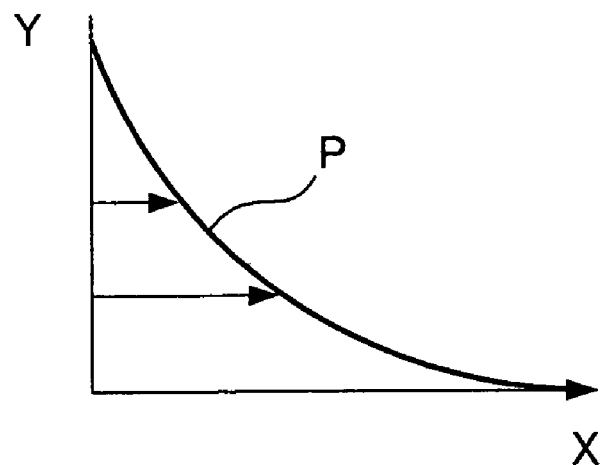
FIG. 15 is a diagram showing the distribution of pressing force in the conventional wet-type multiplate clutch of FIG. 1.

FIG. 13 and FIG. 14 correspond to FIG. 9 and FIG. 10, respectively. In this embodiment, a pressing wall 53 of a friction plate 50 is provided with an inclination such that conversely to the structure of FIG. 9, an inner circumferential area 55 of the pressing wall 53 of the friction plate 50 is apart from an inner circumferential area 26 of a pressing-force receiving wall 24 of a pressure-force receiving portion 23. The pressing wall 53 and the pressure-force receiving wall 24 are in contact with each other at their outer circumferential areas 54 and 25, the pressing-force receiving wall 24 as the pressed contact wall and the pressing wall 53 form therebetween a wedge-shaped space which is gradually reduced in width toward the exterior in the radial direction as viewed in axial cross-section. As the pressing-force receiving portion 23 is elastically flexed in a clockwise direction by a pressing force upon engagement of the clutch, the pressing-force receiving wall 24 and the pressing wall 53 are brought into close contact with each other as shown in FIG. 14. The pressing force is, therefore, applied evenly to substantially the entire area of the pressing-force receiving wall 24 of the pressing-force receiving portion 23.

Figure 16:
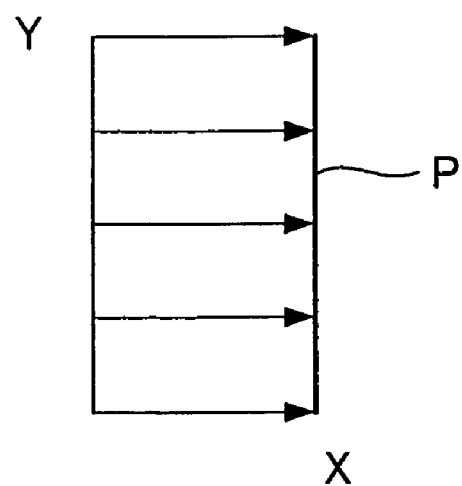
FIG. 16 is a diagram showing the distribution of pressing force in each of the conventional wet-type multiplate clutches according to the first and second embodiments of the present invention.

FIG. 16 is a diagram in which the pressing force is plotted along an abscissa X and the position of the pressed contact wall in the radial direction is plotted along the ordinate Y. In each of the embodiments of the present invention as shown in FIG. 7 through FIG. 14, the pressing force becomes even over the entire circumference of each plate as indicated by p.

As the embodiments, the description has been made based on the clutch in which the single-sided, alternating friction plates having the splines on the outer circumferences thereof and the separator plates having the splines on the inner circumferences thereof are combined on the side of pressing-force receiving walls and on the side of pressing walls, respectively. Other combinations of friction plates and separator plates can include a combination of single-sided, alternating friction plates having splines on the inner circumferences thereof and separator plates having splines on the outer circumferences thereof; a combination of double-sided friction plates having splines on the inner circumferences thereof and separator plates having splines on the outer circumferences thereof; and double-sided friction plates having splines on the outer circumferences thereof and separator plates having splines on the inner circumferences thereof. Needless to say, the present invention can be applied to all of these combinations.

This application claims the priority of Japanese Patent Application 2004-332253 filed Nov. 16, 2004, which is incorporated herein by reference.

The invention claimed is:

1. A wet-type multiplate clutch comprising an outer circumferential drum section, an inner circumferential hub, a pressing member, and a clutch engagement unit composed of plural friction plates and separator plates alternately arranged between said outer circumferential drum section and said inner circumferential hub such that said clutch engagement unit can be pressed by said pressing member toward a pressing-force receiving portion of said outer circumferential drum section, wherein:

one of mutually-contacting walls of said outer circumferential drum section and clutch engagement unit and one of mutually-contacting walls of said clutch engagement unit and pressing member are provided at predetermined contact areas thereof with inclinations such that, when said wet-type multiplate clutch is out of engagement, said mutually-contacting walls of said outer circumferential drum section and clutch engagement unit and said mutually-contacting walls of said clutch engagement unit and pressing member form wedge-shaped spaces therebetween, respectively, as viewed in a radially-extending, axial cross-section, said wedge-shaped spaces being gradually reduced in widths thereof toward an exterior in a radial direction and, when said wet-type multiplate clutch is in engagement, said mutually-contacting walls of said outer circumferential drum section and clutch engagement unit and said mutually-contacting walls of said clutch engagement unit and pressing member radially extend at right angles relative to a central axis of said wet-type multiplate clutch and are in close contact with each other, respectively, wherein the inclinations are formed by a radial taper on at least one of the mutually-contacting walls of said clutch engagement unit, said mutually-contacting wall of said outer circumferential drum section and said mutually-contacting wall of said pressing member.

* * * * *